United States Patent [19]
Stroh

[11] 3,710,481

[45] Jan. 16, 1973

[54] TERMINAL ALIGNMENT AND CONNECTION DEVICE FOR CONDUCTORS OF A MULTICONDUCTOR CABLE

[75] Inventor: Robert Roy Stroh, Downingtown, Pa.

[73] Assignee: Burroughs Corp., Detroit, Mich.

[22] Filed: March 24, 1971

[21] Appl. No.: 127,541

[52] U.S. Cl. ............................................29/203 B
[51] Int. Cl. ...........................................H05k 13/04
[58] Field of Search .29/203 B, 203 R, 203 D, 203 L; 228/5, 44; 219/85; 60/39.24

[56] References Cited

UNITED STATES PATENTS

| | | | |
|---|---|---|---|
| 3,192,358 | 6/1965 | Lasch, Jr. et al. | 219/85 |
| 3,257,707 | 6/1966 | Hotine et al. | 219/85 X |
| 3,283,987 | 11/1966 | Kauffman | 228/5 |
| 3,448,911 | 6/1969 | Cushman | 228/44 |
| 3,449,813 | 6/1969 | Tregubenko | 29/203 B |

*Primary Examiner*—Thomas H. Eager
*Attorney*—Kenneth L. Miller and Charles S. Hall

[57] ABSTRACT

A floating frame, holding a pair of inclined combs, accepts a printed circuit board and the individual conductors of a multiconductor cable. The frame is movable horizontally by a micrometer adjustment device and vertically by torque limit knobs to align and clamp the conductors of the cable into a bonding position on the circuit board after the combs have individually engaged the conductors of the cable.

10 Claims, 11 Drawing Figures

TERMINAL ALIGNMENT AND CONNECTION DEVICE FOR CONDUCTORS OF A MULTICONDUCTOR CABLE

BACKGROUND OF THE INVENTION

The invention relates to an apparatus for handling and holding conductors to be bonded to a circuit structure and more particularly relates to the handling and holding of individual conductors of a multiconductor cable which are to be connected to a printed circuit or microcircuit connecting terminal by utilizing an infrared or other radiant energy source.

In the field of making electrical connections to microcircuit structures or printed circuit boards, it has been customary to use mounting devices that facilitate electrical contact with these circuit structures by press-fit electrical connections, or to solder a conductor directly to the structure by an electron beam or solder gun device. The connecting apparatus for the latter type, which connects conductors directly to a microcircuit or printed circuit board, usually requires hand alignment of the conductors with the terminal on the microcircuit board before energy may be applied to the bonding area.

The few prior art devices of this type that use mechanical means to manipulate the wires into alignment are complex mechanisms that can only handle one wire conductor at a time. In addition, those devices utilizing a radiant energy source must employ complex direction and control devices for the radiant energy source, so that the bonding heat is sufficiently localized to prevent damage to the surrounding area.

Therefore, an object of this invention is the provision of a sturdy, inexpensive and easy-to-operate apparatus for carefully handling and precisely holding a plurality of conductors being bonded by infrared or other radiant energy heating to a circuit structure.

Another object is to provide a conductor handling and holding apparatus that shields the workpiece and cable from the adverse effects of radiant heat by permitting the heat rays to contact only the bonding area.

SUMMARY OF THE INVENTION

These objects and the primary purpose of this invention are accomplished by a pair of inclined combs which grasp the conductors of a multiconductor cable individually, move them into an aligned position, and hold them in that position for bonding by a radiant heat source. The combs are carried by a floating frame that moves horizontally within a frame housing in response to a hand-manipulated micrometer adjustment device. The frame housing carries the frame and combs vertically in response to hand-manipulated torque limit adjustment devices.

DESCRIPTION OF THE DRAWINGS

The advantages of this invention will be readily appreciated as it becomes better understood by reference to the following detailed description when considered with the accompanying drawings in which like reference numerals designate like parts of the figures and wherein.

DESCRIPTION OF THE PREFERRED EMBODIMENT

Figure 1:
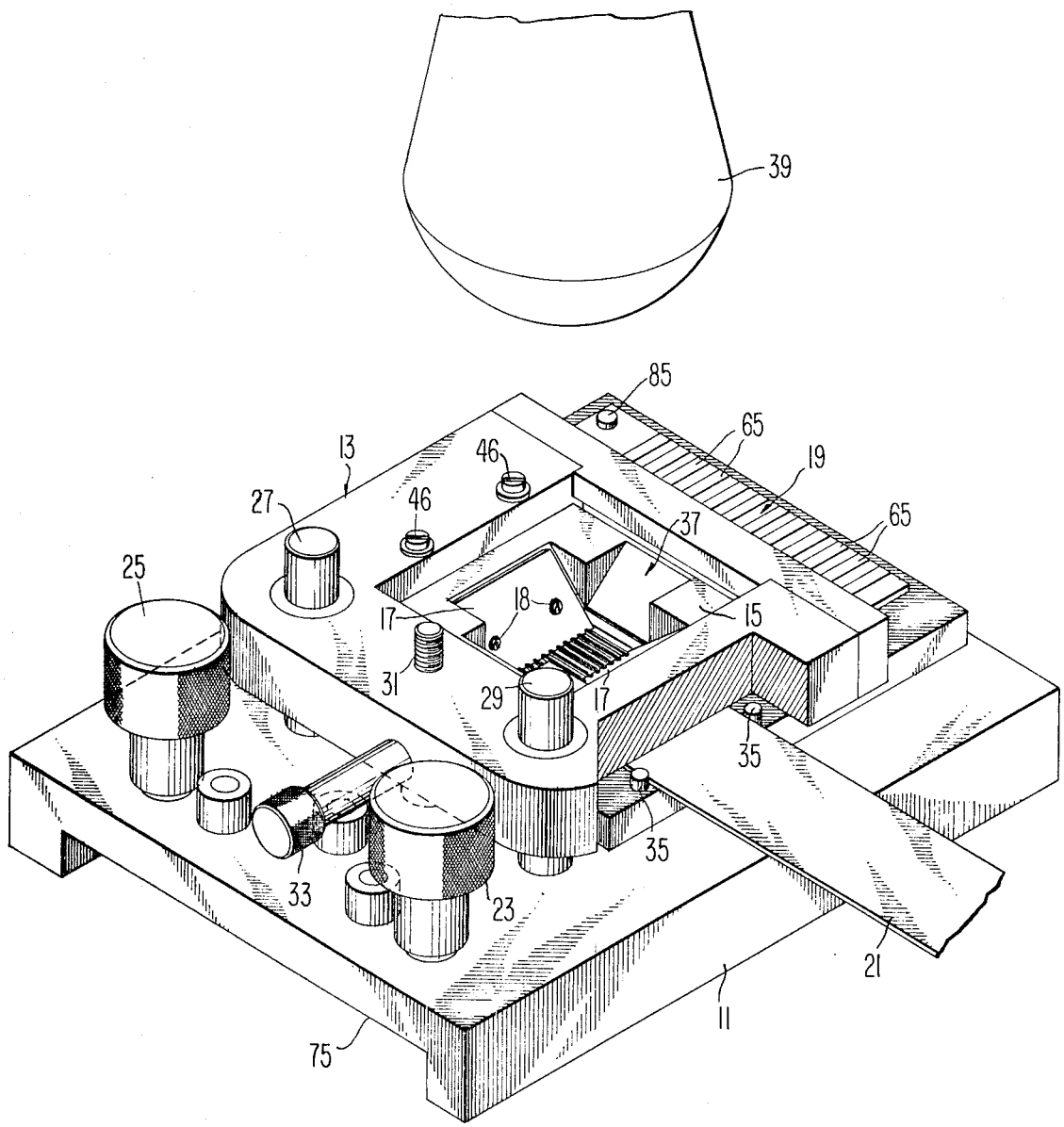
FIG. 1 is a perspective view of the preferred embodiment of the cable alignment and termination device of the invention.

Inclined combs 17 are mounted in floating frame 15 carried by frame housing 13, the frame housing being vertically supported and movable on support rods 27 and 29 which are attached to base 11. Frame housing 13 is moved away from and towards the face of base 11 by torque devices 23 and 25 working in conjunction with drive screw 31 in a manner that will be hereafter explained.

Figure 8:
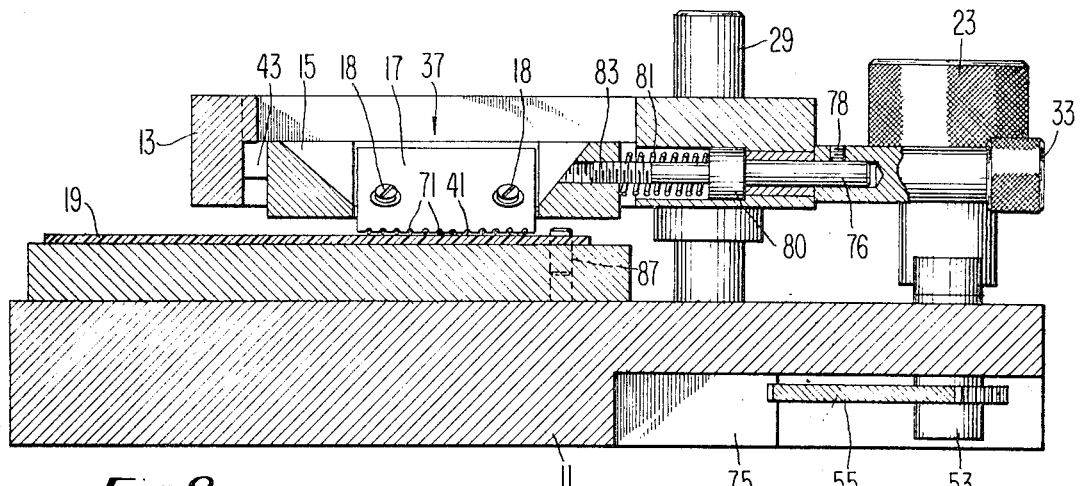
FIG. 8 is a sectional view taken along section lines 8—8 of FIG. 2.

Floating frame 15 is moved transversely and parallel to the face of base 11 by micropositioning device 33 (FIG. 8) which is removably fastened to a shaft 76 by a set screw 78. Shaft 76 is rotatably mounted within frame housing 13 by bearing 80 and threaded into floating frame 15 at its threaded end 83. A spring is placed over shaft 76 between bearing 78 and the side of frame 15 so that rotary movement of micropositioning device 33 will cause floating frame 15 to move in one direction or another, depending on the direction of rotation of device 33.

Figure 3:
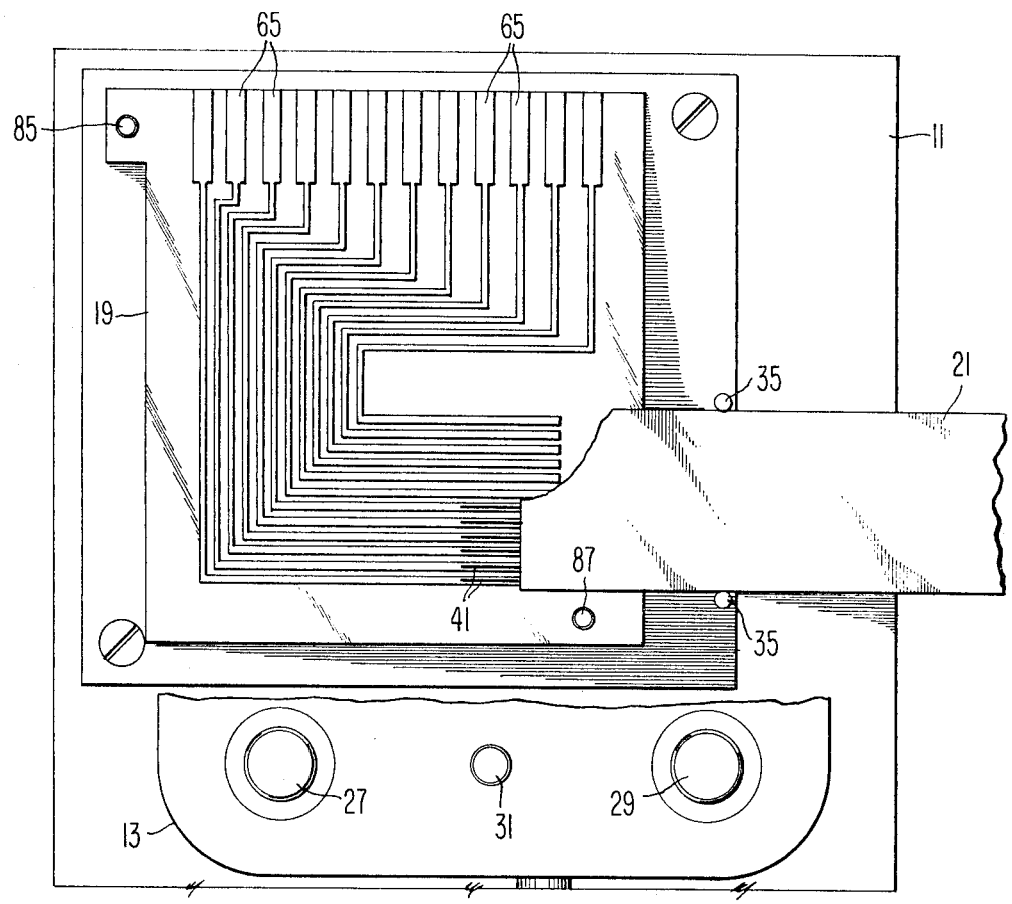
FIG. 3 is a top plan view of FIG. 2 with the frame housing and cable partially broken away to show the placement of the microcircuit structure on the base.

Multiconductor cable 21 (FIG. 3) is guidably inserted underneath frame housing 13 by adjustable guiding posts 35. Microcircuit structure 19 is correctly located on base 11 by adjustable positioning studs 85 and 87 which fit into apertures in microcircuit structure 19.

Figure 2:
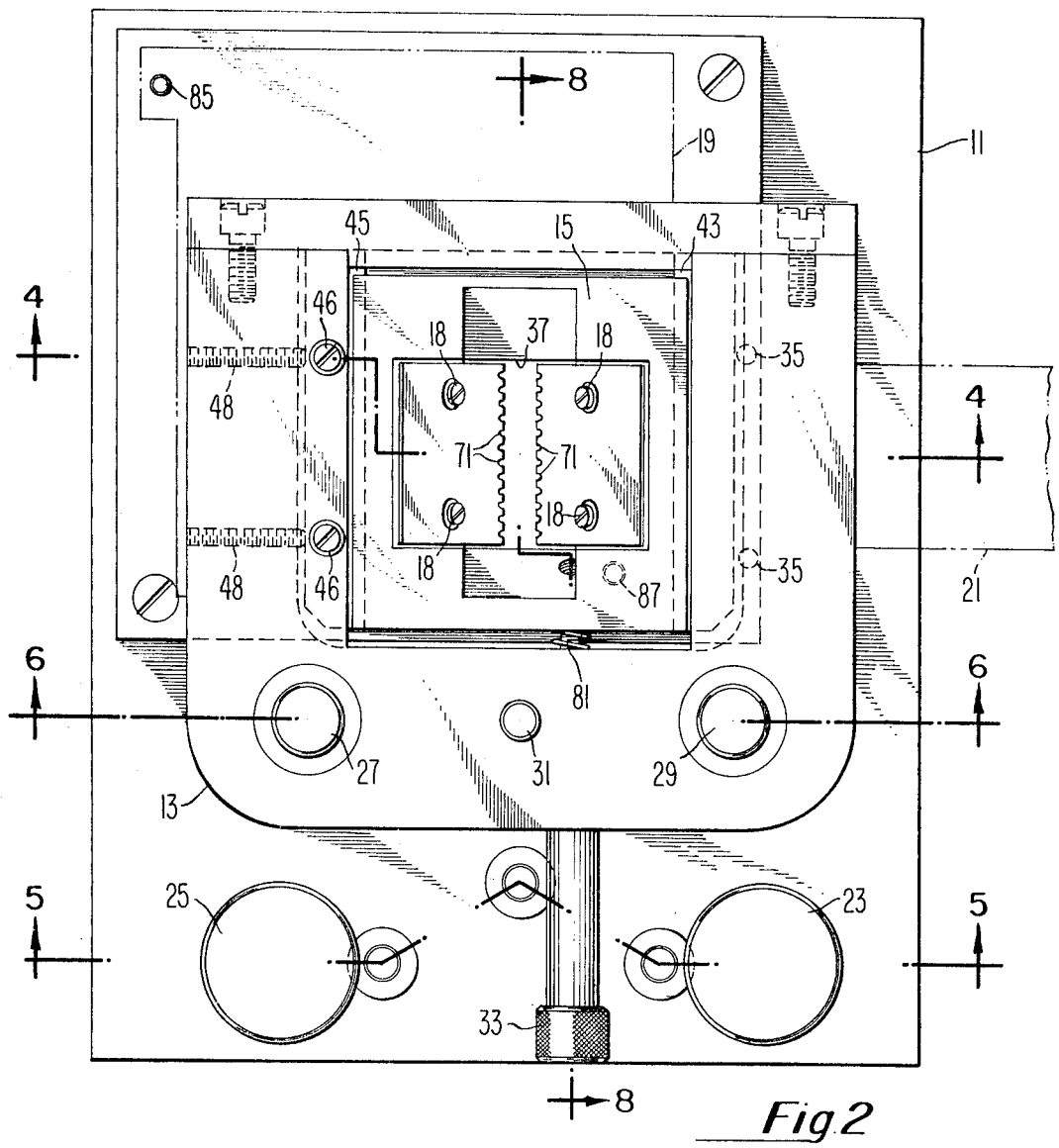
FIG. 2 is a top plan view of FIG. 1.
Figure 4:
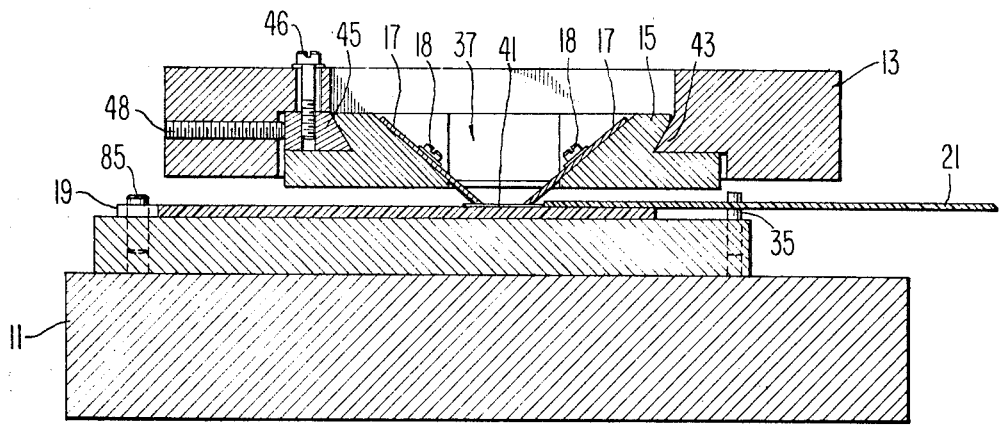
FIG. 4 is a sectional view taken along sectional lines 4—4 of FIG. 2.

Referring now to FIG. 4 which is a cross sectional view taken along section lines 4—4 of FIG. 2, floating frame 15 is suspended in frame housing 13 and orients combs 17 for grasping the conductors of a multiconductor cable while shielding the surrounding area.

Stationary dovetail 43 and adjustably positionable dovetail 45 slidably support frame 15 within the housing 13. Dovetail 45 is supported and positioned by screws 46 and 48. Screw 46 is channelled through frame housing 13 and threaded into dovetail 45. Screw 48 is threaded through housing 13 to contact the backside of dovetail 45. Frame 15 has a pair of V-grooves, one on each side of the frame, to accept dovetails 43 and 45, respectively. Rotation of screw 46 when screw 48 is disengaged from dovetail 45 causes the side of frame 15 which dovetail 45 engages to move closer to or away from the plane of base 11, depending on which direction screw 46 is rotated. Screw 46 provides for accurate alignment of the two dovetails with the V-grooves in frame 15 so that a minimum of friction is encountered when frame 15 moves on dovetails 43 and 45. Screw 48 is tightened, after dovetail 45 is properly adjusted, to lock dovetail 45 into its adjusted position. Micropositioning device 33 (FIG. 1) will cause frame 15 to slide on dovetails 43 and 45 in a direction that is in or out of the plane of the paper of FIG. 4.

Combs 17 are mounted at an incline within frame 15 so that the planes in which the combs respectively lie intersect somewhere underneath frame 15. The two ends of combs 17 that protrude from the bottom of frame 15 are the conductor grasping ends. As shown in FIG. 4, they grasp the bared conductor 41 near its tip and near the insulation of the multiconductor cable 21. The combs 17 may be fixedly mounted to frame 15 in any convenient manner, such as a pair of holding screws 18.

The combs 17 are brought into engagement with the conductor 41, and conductor 41, in turn, with the circuit structure 19 by torque devices 23 and 25 (FIG. 1) working in conjunction with drive screw 31, which is threaded in frame housing 13. This combination causes frame housing 13 to ride up or down on support shafts 27 and 29.

Frame 15 is generally a rectangular block with an aperture 37 therethrough within which combs 17 are mounted as previously explained. This construction of the frame 15 and the above-recited orientation of combs 17 permits radiant energy from an overhead source 39 to only impinge workpiece 19 and cable 21 at the bared portion of conductor 41, thereby providing an effective radiation shield for the area surrounding the bonding site.

Figure 5:
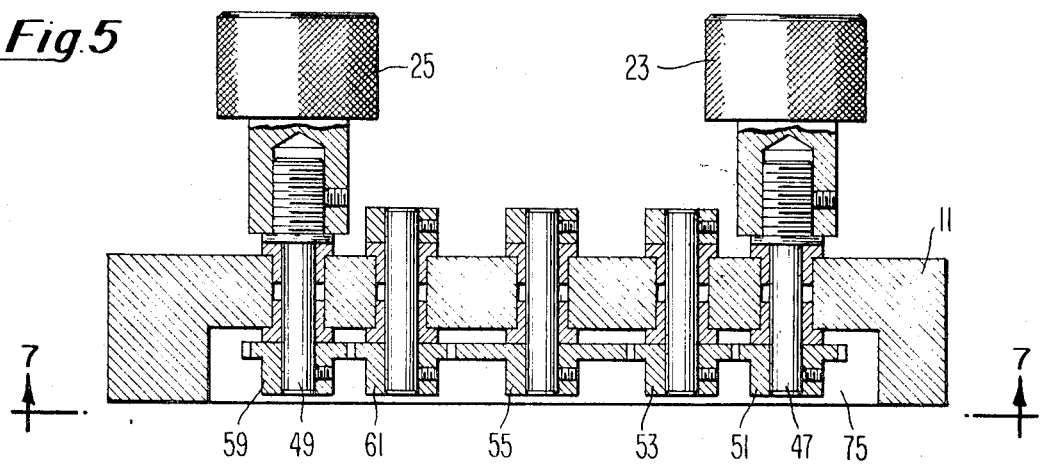
FIG. 5 is a sectional view taken along sectional lines 5—5 of FIG. 2.
Figure 6:
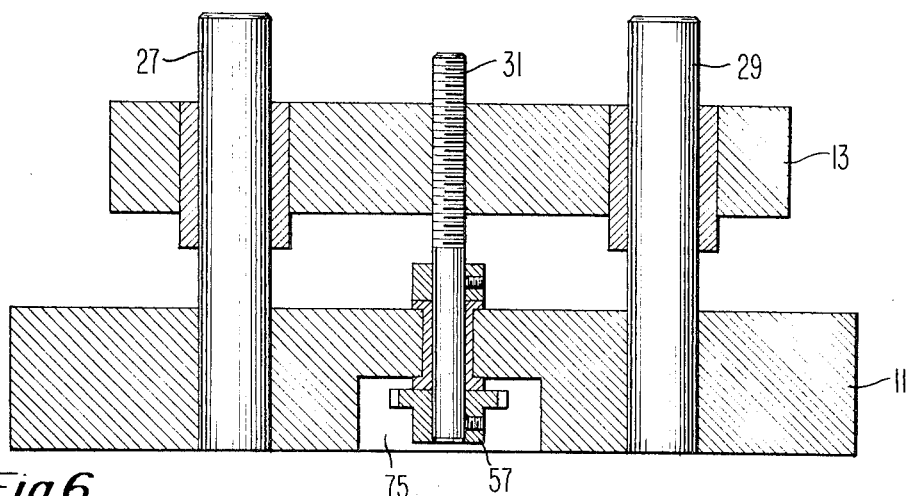
FIG. 6 is sectional view taken along section lines 6—6 of FIG. 2.
Figure 7:
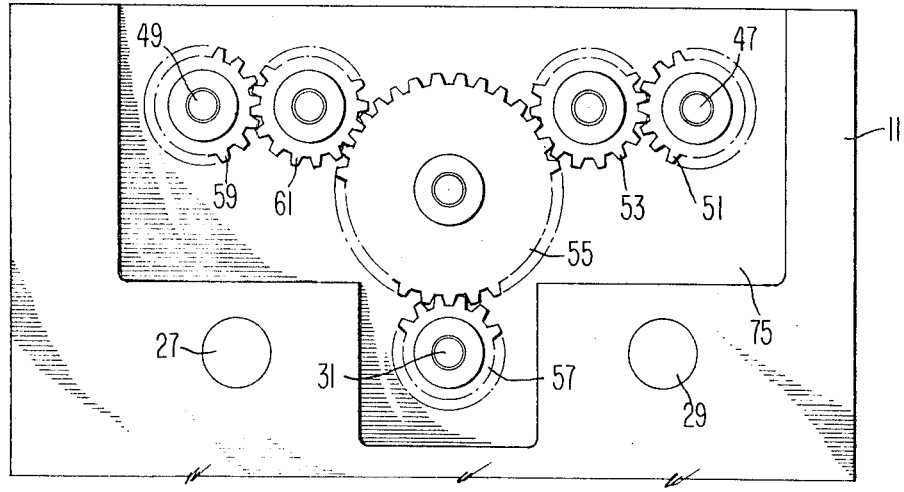
FIG. 7 is a bottom elevation of FIG. 5 taken along lines 7—7.

The relationship of support members 27 and 29 with drive screw 31 and torque devices 23 and 25 is illustrated in FIGS. 5, 6 and 7. Support shafts 27 and 29 (FIG. 6) are fastened to base 11 substantially in line with the location at which drive screw 31 is channelled through the base. Torque devices 23 and 25 (FIG. 5) are located on base 11 in any convenient and accessible location.

Torque devices 23 and 25 are the well known overload yielding type, one example of such a device being disclosed in U.S. Pat. No. 3,525,140. Each device has only one predetermined torque limit, the limit on one device being higher than the limit on the other device. Both torque devices 23 and 25 are geared to drive screw 31 underneath base 11.

Drive screw 31 has a gear 57 (FIG. 7) attached to its end underneath the apertured portion 75 of base 11 which meshes with and is driven by a gear 55. Gear 55 is linked to gears 51 and 59 by gears 53 and 61, respectively. Gears 51 and 59 are attached to shafts 47 and 49 of torque devices 23 and 25. In this arrangement, whenever either torque device 23 or 25 is rotated, drive screw 31 will be rotated also.

Figure 9:
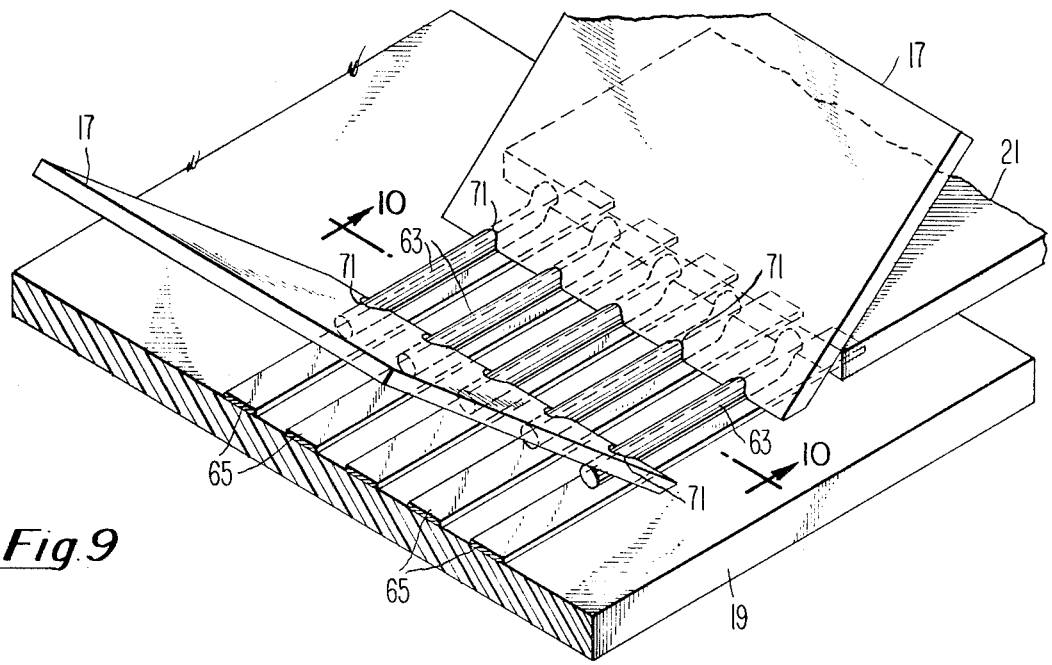
FIG. 9 is a diagrammatic representation of the relationship of the holding combs of the device with the conductor of a cable and a circuit structure to which the cables are to be bonded.
Figure 10:
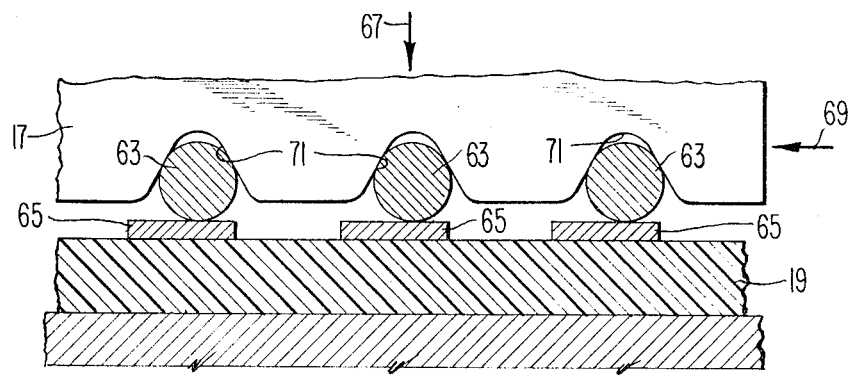
FIG. 10 is a partial sectional view taken along section lines 10—10 of FIG. 9 when the conductors are out of alignment with the circuit structure.
Figure 11:
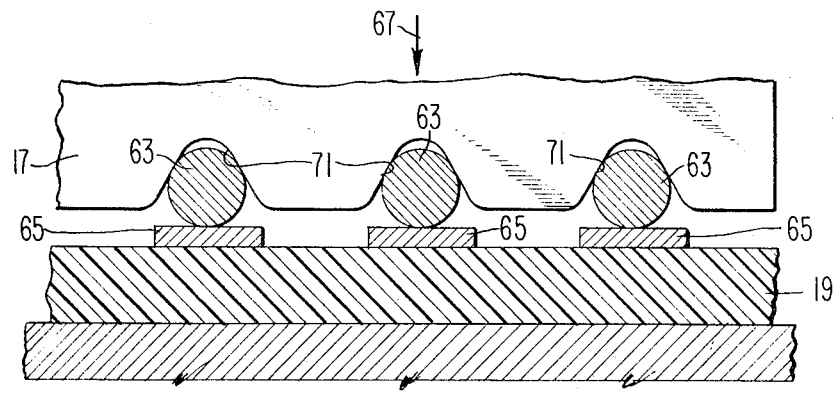
FIG. 11 is a partial sectional view taken along section lines 10—10 of FIG. 9 when the conductors are in alignment with the circuit structure.

The functional relationship of the micropositioning device and the two torque devices with the holding combs 17 to cause holding and manipulating of a plurality of conductors will now be explained with reference to FIGS. 9, 10 and 11. Upon microcircuit structure 19 and cable 21 being inserted and positioned underneath frame housing 13 (FIG. 1) and conductors 63 of cable 21 being properly spaced to coincide with serrations 71 on combs 17, the torque device having the lower torque limit lowers the combs in a vertical plane in a direction 67 perpendicular to the plane of microcircuit structure 19, in the manner explained above, to engage conductors 63 and bring them into contact with the conductive portions 65 on the surface of the microcircuit structure. The torque limit setting of this device is such that blades 17 will engage conductor 63 with sufficient force to prevent conductors 63 from shipping from underneath serrations 71 but still permit lateral movement of conductors 63 across the face of microcircuit structure 19.

Assuming that conductors 63 are not aligned perfectly with conductive sections 65 of microcircuit structure 19, micropositioning device 33 is utilized to move blades 17 in a lateral direction 69 in a plane parallel to microcircuit structure 19 to obtain visual alignment of conductors 63 with strips 65.

Upon such alignment, the torque device having the higher torque limit is utilized to hold the wires in a stationary position. This torque device has a torque limit that is sufficient to prevent movement of the conductors in a lateral direction 69 and to simultaneously clamp conductors 63 to conductive sections 65. At this point, the desired radiant energy source may be actuated to cause structural connection of conductors 63 with strip 65.

Although the embodiment illustrates the use of two combs to hold each individual conductor at two points it is also conceived that one comb could be utilized with a negligible decrease in the holding and maneuvering capabilities, and some decrease in the shielding effectiveness.

From the foregoing, it can be seen that this invention provides a sturdy, inexpensive and easily operated apparatus for carefully handling and accurately holding conductors to be bonded by infrared or other radiant energy and in addition eliminates the necessity of expensive radiant energy control devices by shielding the workpiece and cable from the adverse effects of radiant heat. It should be understood, of course, that the foregoing disclosure relates to a preferred embodiment of the invention and that numerous modifications or alterations may be made therein without departing from the spirit or scope of the invention as set forth in the appended claims.

I claim:

1. In an alignment and connection device, apparatus for grasping and manipulating the individual conductors of a multiconductor cable into bonding position with a workpiece comprising:
    a frame housing for receiving the workpiece and the individual conductors of a multiconductor cable;
    a floating frame mounted in said housing for movement over said workpiece and the conductors of the cable; and
    means carried by said frame for individually grasping each conductor in said cable.
2. The apparatus of claim 1 further comprising:
    means for moving said frame horizontally; and
    means for moving said frame vertically.

3. The apparatus of claim 2 wherein said means for horizontally moving said frame comprises:
   a micropositioning device threaded through said frame housing.

4. The apparatus of claim 2 wherein said means for moving said frame vertically comprises:
   a torque screw vertically threaded through said frame housing;
   a first torque device driveably connected to said screw for vertically moving both said frame housing and frame and having a predetermined torque limit;
   a second torque device driveably connected to said screw for vertically moving both said frame housing and frame and having a greater torque limit than said first torque device.

5. The apparatus of claim 4 wherein said means for moving said frame horizontally comprises:
   a micropositioning device threaded through said frame housing.

6. The apparatus of claim 4 wherein said means for individually grasping each conductor comprises:
   a pair of inclined holding combs.

7. The apparatus of claim 6 wherein said holding combs include a serrated edge on each comb for holding an individual wire of a multiconductor cable in each serration.

8. The apparatus of claim 4 wherein said means for individually grasping each conductor comprises:
   an inclined holding comb having a serrated holding edge.

9. The apparatus of claim 4 further comprising:
   a pair of support rods journalled through said frame housing for guiding the vertical movement of said housing.

10. The apparatus of claim 1 wherein said device includes a source of radiant energy and wherein said means for individually grasping each conductor includes means for shielding the cable and the workpiece from adverse effects of radiant heat.

* * * * *